US012023942B2

(12) United States Patent
Leoni et al.

(10) Patent No.: US 12,023,942 B2
(45) Date of Patent: Jul. 2, 2024

(54) IMAGE FORMATION DEVICE INCLUDING A LIQUID REMOVAL BELT

(71) Applicant: Hewlett-Packard Development Company, L.P., Spring, TX (US)

(72) Inventors: Napoleon J Leoni, Palo Alto, CA (US); Omer Gila, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/754,865

(22) PCT Filed: Nov. 14, 2019

(86) PCT No.: PCT/US2019/061386

§ 371 (c)(1),
(2) Date: Apr. 15, 2022

(87) PCT Pub. No.: WO2021/096505

PCT Pub. Date: May 20, 2021

(65) Prior Publication Data

US 2024/0092103 A1 Mar. 21, 2024

(51) Int. Cl.

*B41J 29/17* (2006.01)
*B41J 2/04* (2006.01)
*B41J 11/00* (2006.01)

(52) U.S. Cl.

CPC ................. *B41J 29/17* (2013.01); *B41J 2/04* (2013.01); *B41J 11/002* (2013.01); *B41J 2002/043* (2013.01)

(58) Field of Classification Search

CPC ... B41J 29/17; B41J 2/04; B41J 11/002; B41J 2002/043

See application file for complete search history.

(56) References Cited

U.S. PATENT DOCUMENTS

| | | | |
|---|---|---|---|
| 5,966,157 | A | 10/1999 | Dolan |
| 6,719,423 | B2 | 4/2004 | Chowdry et al. |
| 7,497,564 | B2 | 3/2009 | Yui |
| 7,712,889 | B2 | 5/2010 | Inoue |
| 8,246,754 | B2 | 8/2012 | Nauka et al. |
| 9,021,949 | B2 | 5/2015 | Biegelsen |
| 9,358,778 | B2 | 6/2016 | Gila et al. |

(Continued)

FOREIGN PATENT DOCUMENTS

| | | | |
|---|---|---|---|
| CN | 204700705 | U | 10/2015 |
| GB | 1454950 | A | 11/1976 |

(Continued)

*Primary Examiner* — Justin Seo
*Assistant Examiner* — Tracey M McMillion
(74) *Attorney, Agent, or Firm* — Michael Dryja

(57) ABSTRACT

An image formation device includes a support to support movement of a substrate along a travel path, a fluid ejection device, and a belt. The fluid ejection device is located along the travel path to deposit droplets of ink particles within a liquid carrier onto the substrate to at least partially form an image on the substrate. The belt is a flexible belt located downstream along the travel path from the fluid ejection device and includes a contact portion to arcuately conform relative to, and be in movable contact against, a first arcuate portion of the substrate to at least partially remove the liquid carrier from the substrate.

15 Claims, 9 Drawing Sheets

(56) References Cited

U.S. PATENT DOCUMENTS

| | | | |
|---|---|---|---|
| 2008/0229953 | A1 | 9/2008 | Saito et al. |
| 2009/0203834 | A1 | 8/2009 | Hiraoka et al. |
| 2014/0125747 | A1 | 5/2014 | Gila et al. |
| 2017/0232760 | A1 | 8/2017 | Nishitani et al. |
| 2019/0009578 | A1 | 1/2019 | Takeuchi et al. |

FOREIGN PATENT DOCUMENTS

| | | | | | |
|---|---|---|---|---|---|
| JP | 2008266022 | A | * | 11/2008 | .......... B41J 11/0035 |
| JP | 2012-126008 | A | | 7/2012 | |
| JP | 2016-101713 | A | | 6/2016 | |

* cited by examiner

IMAGE FORMATION DEVICE INCLUDING A LIQUID REMOVAL BELT

BACKGROUND

Modern printing techniques involve a wide variety of media, whether rigid or flexible, and for a wide range of purposes. In some printing techniques, a liquid carrier may be used as part of depositing ink particles onto a substrate when forming an image.

DETAILED DESCRIPTION

Figure 1A:
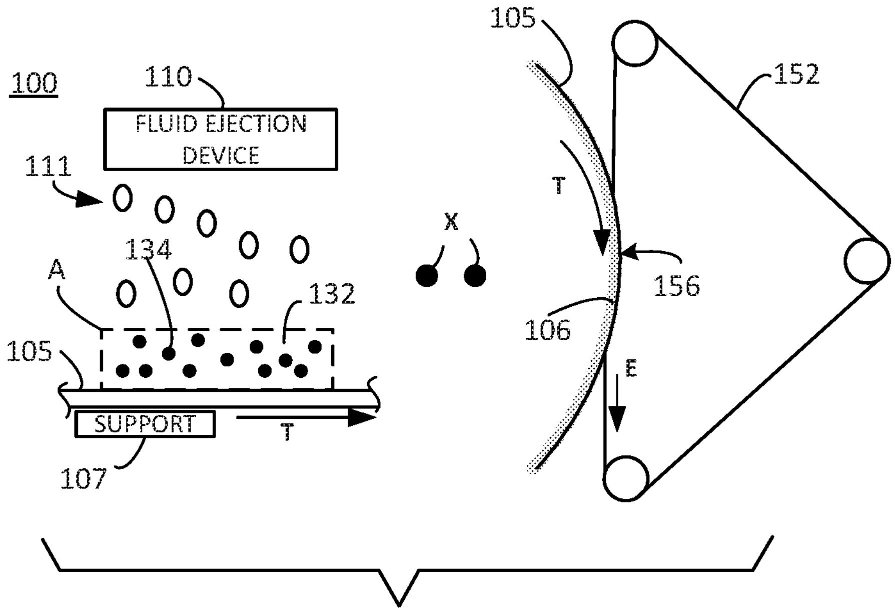
FIG. 1A is a diagram including side views schematically representing at least some aspects of an example image formation device.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure comprise an image formation device comprising a belt to remove liquid after deposition of ink particles within a liquid carrier onto a substrate. In some examples, the image formation device comprises a support to support movement of a substrate along a travel path while a fluid ejection device is positioned along the travel path to deposit droplets of ink particles within a liquid carrier onto the substrate to at least partially form an image on the substrate. A flexible belt is located downstream along the travel path from the fluid ejection device. The belt includes a contact portion to arcuately conform relative to, and be in moving contact against, a first arcuate portion of the substrate to at least partially remove the liquid carrier from the substrate.

In some examples, the liquid carrier may comprise an aqueous-based fluid. In some examples, the liquid carrier may comprise a non-aqueous fluid.

In some such examples, the belt may comprise a non-porous belt which squeezes the liquid carrier out or off of the substrate, while in some examples, the belt may comprise a porous belt which may draw the liquid carrier out or off the substrate. Such liquid withdrawal may be achieved via capillary forces exerted via the porous belt and/or mechanisms.

Via such example arrangement, the contact portion of the belt establishes a belt-controlled contact zone in which the belt is in contact with the substrate over a significantly great length than a roller-to-roller-based nip, thereby providing a longer period of time over which liquid may be removed from the substrate. Moreover, such example arrangements may result in more uniform pressure along the contact zone (than a roller-to-roller nip) and a significantly lower pressure in the contact zone (than present in a roller-to-roller nip). In addition, in some examples, the belt moves at generally the same speed as the substrate such that shear forces are generally avoided, which stands in sharp contrast to a roller-to-roller nip in which shear forces may be present due to a speed differential between the belt (supported directly by a roller) and the imaging drum (e.g. roller).

Via such example arrangements, a high volume of liquid may be rapidly removed from a substrate following deposition of ink particles within a liquid carrier onto the substrate.

In some examples, the image formation device comprises a charge element(s) to emit charges onto the belt in the contact zone to increase and control the pressure of the belt against the substrate, which may enhance engagement of the belt in the contact zone relative to the substrate. In some examples, a vacuum is applied to the belt in the contact zone to increase the rate of liquid removal, such as when the belt comprises a porous structure. In one aspect, placement of the vacuum and/or of the charge element(s) in this location may be enabled, at least in part, via the absence of a roller (to support the belt) at the contact zone.

These examples, and additional examples, are further described below in association with at least FIGS. 1A-13.

FIG. 1A is a diagram including side views schematically representing at least some aspects of an example image formation device 100. As shown in FIG. 1A, a support 107 supports a substrate 105 for movement along a travel path T. The support 107 may take various forms such as, but not limited to, a rotatable drum or a plurality of rollers, as later described in association with at least FIG. 2 and FIG. 3, respectively.

As further shown in FIG. 1A, in some examples the image formation device 100 comprises a fluid ejection device 110 and a flexible belt 152. The fluid ejection device 110 is located along the travel path T to deposit droplets 111 of ink particles 134 within a liquid carrier 132 onto the substrate 105 to at least partially form an image on the substrate 105.

In some examples, the flexible belt 152 is located downstream along the travel path T from the fluid ejection device 110. As shown in FIG. 1A, among other features the belt 152 includes a contact portion 156 to arcuately conform relative to, and be in moving contact against, a first arcuate portion 106 of the substrate 105 to remove at least a portion of the liquid carrier 132 from the substrate 105. In some such examples, the belt 152 may sometimes be referred to as an endless belt because it forms a loop about a plurality of rollers in some examples, with the belt having no discrete end or beginning. In some examples, the belt 152 also may be referred to as rotating in an endless loop, i.e. a loop having no discrete end or beginning.

In some such examples, the moving contact may comprise rolling contact between the belt 152 and the substrate 105. However, in some examples, the moving contact may comprise sliding contact.

Because belt 152 rotates in a loop (as represented by directional arrow E), the contact portion 156 corresponds to different portions of belt 152 which engage the substrate 105 as the belt 152 rotates. In other words, the contact portion 156 does not comprise a static portion of belt 152 in a static position. Similarly, at the same time that the belt 152 is rotating (directional arrow E) in a loop, the substrate 105 is moving along travel path T. In some such examples, the belt 152 moves (rotates in the endless loop) at a speed which is substantially the same as the speed at which substrate 105 travels along the travel path T. In one aspect, this arrangement may minimize or eliminate shear forces, which might otherwise be present if the belt 152 and substrate 105 were moving at substantially different speeds.

Depending upon the particular structure and/or materials forming the belt 152, the belt 152 may absorb the liquid carrier 132 on the substrate 105 such as when the belt 152 is porous and/or the belt 152 may push the liquid carrier 132 off to the sides of the belt 152 (and/or in front of the control portion 156), such as when the belt 152 is non-porous. At least some of these examples, will be further described below in association with at least FIGS. 4A-7B.

Figure 1B:
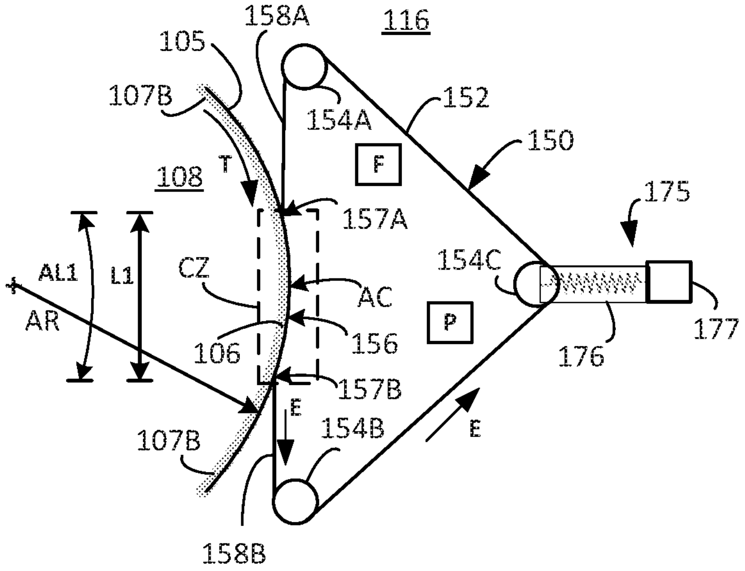
FIG. 1B is a diagram including a side view schematically representing an example belt arrangement to remove liquid from a substrate.

As further shown in FIG. 1B, in some examples the belt 152 forms part of a belt arrangement 150 comprising an array of rollers 154A, 154B, 154C, which act to drive and/or support the flexible belt 152 to continually rotate along path E (e.g. the endless loop) about the rollers. In some examples, the rollers 154A, 154B, 154C are positioned relative to each other, and relative to the substrate 105 to cause the contact portion 156 of the belt 152 to be in arcuate conforming movable contact against the substrate 105. In one aspect, the arc length AL1 is at least partially determined by a position of the rollers 154A and 154B with respect to a center of the arc (e.g. an arc center) (AC) of the contact portion 156 and by the a radius of the arc (e.g. arc radius) (AR) defined by the contact portion 156 of belt 152.

In some examples, the belt 152 (FIG. 1A) may sometimes be referred to as a liquid removal element and/or the belt arrangement 150 (FIG. 1B) may sometimes be referred to as a liquid removal arrangement.

Via this arrangement, the contact portion 156 comprises a leading edge 157A at which the belt 152 initiates contact with the substrate 105 and a trailing edge 157B at which the belt 152 terminates contact with the substrate 105. In one aspect, the distance along the contact portion 156 of belt 152 between the respective edges 157A, 157B may sometimes be referred to as arc length (AL1). The distance (L1) through which the belt 152 engages the substrate 105 also may be referred to as a contact zone, as represented by the dashed box CZ.

In some examples, the pressure of the belt 152 exerted against the substrate 105 may be, at least in part, be controlled via controlling a tension of belt 152, the arc radius (AR), and an arc length (AL1), as further described below. Via this arrangement, in some examples the time duration of contact (between the belt 152 and the substrate 105) in the contact zone CZ may be controlled generally independently from the average pressure in the contact zone CZ. In some examples, for small wrap angles (e.g. arc length less than 40 degrees), the average pressure in the contact zone CZ may be approximated by the formula $Pressure=2\times Tbelt/AR$, where Tbelt comprises the tension on belt 152 per unit length (N/m). In some examples, the target average pressure (between the belt 152 and the substrate 105) in the contact zone CZ is about 1 kiloPascals to about 200 kiloPascals. These average pressures in at least some of the examples of the present disclosure are significantly less than a pressure in an ordinary belt-roller nip, which may be around 1 MegaPascals, which is at least one order of magnitude greater than the target average pressure in the contact zone in the examples of the present disclosure. The lower pressure in the examples of the present disclosure may reduce wear and tear on the belt 152 and substrate 105 to promote longevity of the liquid removal arrangement, including belt 152.

In some such examples, given the above-noted target average pressure, the tension per unit length of the belt (i.e. TBelt) may be computed from the range of average pressure (i.e. about 1 to about 200 kiloPascals) according to the desired arc radius (AR). In one aspect, a decrease in the arc radius (AR) will cause a higher average pressure in the contact zone for a given (i.e. same) same belt tension (Tbelt).

In some examples, the belt tension may have an upper limit set by the yield strength of the backbone of belt 152, which depends on the particular materials and/or structure forming the belt 152. This yield strength may in turn limit an upper value of the recommended average pressure in the contact zone for a given belt 152. For example, for a belt 152 made of polyimide material, the yield strength is about 70 MegaPascals in some examples. Assuming a safety factor of 0.5, and a belt 152 having a thickness of about 200 microns, the tension of the belt (i.e. TBelt) is to be limited to 7 kN/m, in some examples. Further assuming a drum radius in which the arc radius is AR=0.15 meters, the resulting maximum average pressure in the contact zone would be 93 kiloPascals. It will be understood that this example represents just one example in determining tension and/or pressure on belt 152 for a given type of material, arc radius, etc. and is not limiting on the full range of some example target average pressures (e.g. 1 kiloPascals to about 200 kiloPascals) in the contact zone, as noted above.

In some examples, the arc length (AL1) may comprise between about 3 and about 30 centimeters. In some examples, the arc length (AL1) may comprise between about 5 and about 25 centimeters. In some examples, the arc length (AL1) may comprise between about 10 and 20 centimeters.

As further shown in FIG. 1B, a first non-contact portion 158A of the belt 152 precedes the contact portion 156 of belt 152, while a second non-contact portion 158B follows the contact portion 156 of belt 152. An arcuate portion 106 of the substrate 105 defines a region of the substrate 105 against which the contact portion 156 of the belt 105 engages under pressure. At least the arcuate portion 106 of the substrate 105 is supported directly by an arcuate support structure in the region coextensive with the contact portion 156 of belt 152, with the arcuate support structure 108 comprising a drum, support roller, or the like, as later shown in FIGS. 2 and 3. A first non-contact portion 107A of the substrate 105 precedes the contact zone CZ and a second non-contact portion 107B of the substrate 105 follows the contact zone CZ.

As shown in FIGS. 1A-1B, the belt 152 is supported by the rollers 154A, 154B, 154C which are spaced apart from each other along a length of the belt in a manner in which the rollers are positioned in locations other than the contact zone CZ. Stated differently, the contact portion 156 of the belt 152 is supported without a backing roller on a side of the belt 152 opposite to the arcuate portion 106 of the substrate 105 within the contact zone. In other words, the contact portion 156 of the belt 152 is unsupported by a roller in the contact zone CZ. This arrangement enables placing various elements (e.g. a vacuum, charge emitters, etc.) along the contact portion 156 of the belt 152 at the contact zone CZ, to facilitate removing liquid from belt 152, to increase and/or control the pressure at which the belt 152 engages the substrate 105, and/or to implement other functions relative to belt 152 at the contact zone CZ.

As further shown in FIG. 1B, in some examples the belt arrangement 150 may comprise a positioner (schematically represented via box P) to control a position of at least some of the support rollers 154A, 154B, 154C in order to control a position of the contact portion 156 of the belt 152 relative to the arcuate portion 106 of the substrate 105. This position control may, in turn, control a pressure of the belt 152 against, and/or control an arc length of the contact portion 156 of the belt 152 relative to, the substrate 105. In some such examples, the positioner P may be cooperative with a frame (schematically represented via box F) of the belt arrangement 150 to support, and control positioning of, the rollers 154A, 154B, 154C to control pressure of the contact portion 156 of the belt 152 on the substrate 105. In some examples, such positioning also may at least partially determine a tension of the belt 152.

As further shown in FIG. 1B, in some examples the belt arrangement 150 comprises a belt tensioner 175 to control a tension of the belt 152. In some such examples, the belt tensioner 175 may comprise a spring 176 (or equivalent element) connected between a roller (e.g. 154C) and an anchor or weight 177.

In some examples, the belt positioner (P), belt tensioner (175), and/or other features, elements associated with the image formation device 100 (e.g. substrate speed, belt speed, etc.) shown in FIGS. 1A, 1B may be controlled and/or monitored via an image formation engine and/or control portion, such as but not limited to the image formation engine 1250 and/or control portion 1400, as later described in association with at least FIGS. 12A and 12B.

In some examples, the fluid ejection device 110 comprises a drop-on-demand fluid ejection device. In some examples, the drop-on-demand fluid ejection device comprises an inkjet printhead. In some examples, the inkjet printhead comprises a piezoelectric inkjet printhead. In some examples, the fluid ejection device 110 may comprise other types of inkjet printheads. In some examples, the inkjet may comprise a thermal inkjet printhead. In some examples, the droplets may sometimes be referred to as being jetted onto the media. With this in mind, at least some of the aspects and/or implementations of image formation according to at least some examples of the present disclosure may sometimes be referred to as "jet-on-media", "jet-on-substrate", "jet-on-blanket", "offjet printing", and the like.

It will be understood that in some examples, the fluid ejection device 110 may comprise a permanent component of image formation device 100, which is sold, shipped, and/or supplied, etc. as part of image formation device 100. It will be understood that such "permanent" components may be removed for repair, upgrade, etc. as appropriate. However, in some examples, fluid ejection device 110 may be removably received, such as in instances when fluid ejection device 110 may comprise a consumable, be separately sold, etc.

In some examples, the liquid carrier 132 may comprise an aqueous liquid carrier.

Figure 10:
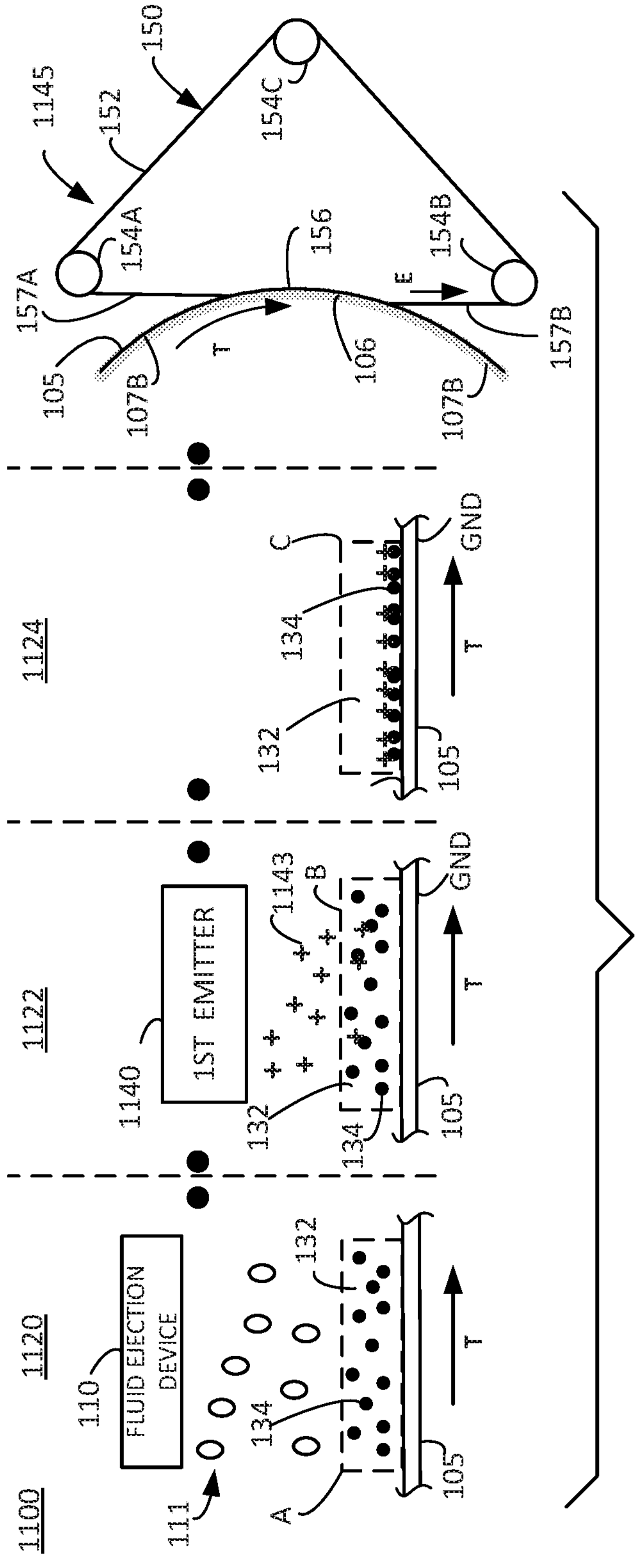
FIG. 10 is a diagram including side views schematically representing at least some aspects of an example image formation device.
Figure 11:
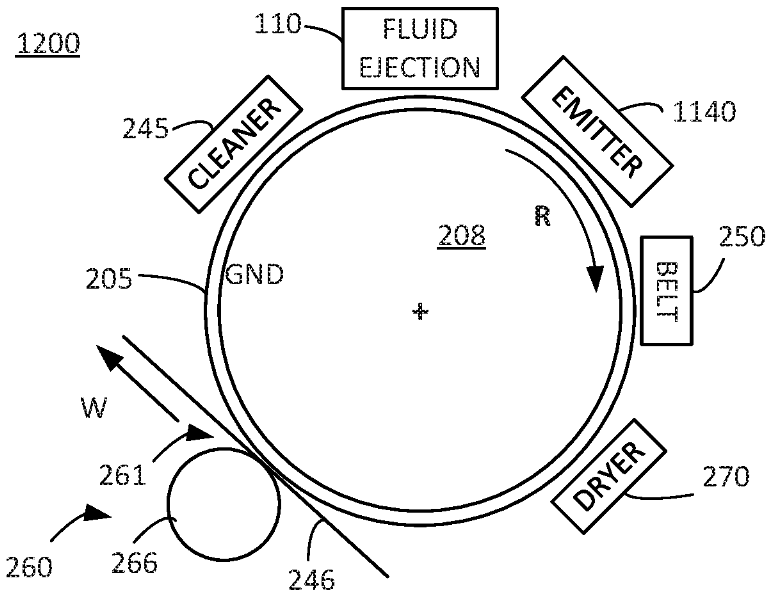
FIG. 11 is a diagram including a side view schematically representing an example image formation device including a rotatable drum-type substrate and a charge emitter for electrostatic fixation of ink particles.

However, in some examples, the liquid carrier 132 may comprise a non-aqueous liquid carrier, such as in the example image formation devices described in association with at least FIGS. 10-11. In some such examples, when non-aqueous dielectric inks are used, and when electrostatic fixation (i.e. pinning) of ink particles 134 is implemented as shown in FIGS. 10 and 11, an electrically conductive element separate from the substrate 105 is provided to contact the substrate 105 in order to implement grounding of the substrate 105.

In some examples, substrate 105 comprises a metallized layer or foil. However, in some examples, the substrate is not metallized and comprises no conductive layer.

In some examples, the substrate 105 comprises a non-absorbing material, non-absorbing coating, and/or non-absorbing properties. Accordingly, in some examples the substrate 105 is made of a material which hinders or prevents absorption of liquids, such as a liquid carrier 132 and/or other liquids in the droplets received on the medium. In one aspect, in some such examples the non-absorbing medium does not permit the liquids to penetrate, or does not permit significant penetration of the liquids, into the surface of the non-absorbing medium.

The non-absorbing example implementations of the substrate 105 stands in sharp contrast to some forms of media, such as paper, which may absorb liquid. The non-absorbing attributes of the substrate 105 may facilitate drying of the ink particles on the media at least because later removal of liquid from the media will not involve the time and expense of attempting to pull liquid out of the media (as occurs with absorbing media) and/or the time, space, and expense of providing heated air for extended periods of time to dry liquid in an absorptive media.

Via the above-described example arrangements in which a belt arrangement is used to remove a liquid carrier from a substrate, the example device and/or associated methods can print images on a non-absorbing medium (or some other medium) with minimal bleeding, dot smearing, etc. while permitting high quality color on color printing. Moreover, via these examples for belt-controlled liquid removal, image formation on a non-absorbing medium (or some other medium) can be performed with less time, less space, and less energy at least due to a significant reduction in drying time and capacity. These example arrangements stand in sharp contrast to other printing techniques lacking such belt-controlled liquid removal, such as high coverage, aqueous-based step inkjet printing utilizing roller-to-roller nip based liquid removal (or similar mechanical elements) which may not adequately remove the liquid unless higher cost, and lengthy drying is applied.

In some such examples, the non-absorptive substrate 105 may comprise other attributes, such as acting as a protective layer for items packaged within the media. Such items may comprise food or other sensitive items for which protection from moisture, light, air, etc. may be desired.

With this in mind, in some examples the substrate 105 may comprise a plastic media. In some examples, the substrate 105 may comprise polyethylene (PET) material, which may comprise a thickness on the order of about 10 microns. In some examples, the substrate 105 may comprise a biaxially oriented polypropylene (BOPP) material. In some examples, the substrate 105 may comprise a biaxially oriented polyethylene terephthalate (BOPET) polyester film, which may be sold under trade name Mylar in some instances. In some examples, the substrate 105 may comprise other types of materials which provide at least some of the features and attributes as described throughout the examples of the present disclosure. For examples, the substrate 105 or portions of substrate 105 may comprise a metallized foil or foil material, among other types of materials.

In some examples, substrate 105 comprises a flexible packaging material. In some such examples, the flexible packaging material may comprise a food packaging material, such as for forming a wrapper, bag, sheet, cover, etc. As previously mentioned for at least some examples, the flexible packaging materials may comprise a non-absorptive media.

In some examples, the image formation device may sometimes be referred to as a printer or printing device. In some examples in which a media is supplied in a roll-to-roll arrangement or similar arrangements, the image formation device may sometimes be referred to as a web press and/or the print medium can be referred to as a media web.

At least some examples of the present disclosure are directed to forming an image directly on a print medium, such as without an intermediate transfer member. Accordingly, in some instances, the image formation may sometimes be referred to as occurring directly on substrate 105, which may sometimes be referred to the print medium in such instances. However, this does not necessarily exclude some examples in which an additive layer may be placed on the print medium prior to receiving ink particles (within a carrier fluid) onto the print medium. In some instances, the print medium also may sometimes be referred to as a non-transfer medium to indicate that the medium itself does not comprise a transfer member (e.g. transfer blanket, transfer drum) by which an ink image is to be later transferred to another print medium (e.g. paper or other material). In this regard, the print medium may sometimes also be referred to as a final medium or a media product. In some such instances, the medium may sometimes be referred to as product packaging medium.

In some examples, the substrate 105 may sometimes be referred to as a non-transfer substrate, i.e. a substrate which does not act as a transfer member (e.g. a member by which ink is initially received and later transferred to a final substrate bearing an image). Rather, in some such examples, the substrate 105 may comprise a final print medium such that the printing or image formation may sometimes be referred as being direct printing because no intermediate transfer member is utilized as part of the printing process.

In some examples, the substrate 105 comprises an intermediate transfer member, such as (but not limited to) the example image formation device 500 further described in association with at least FIGS. 1, 2-3, 10. In some instances, such an intermediate transfer member may be referred to as a blanket.

As shown in FIG. 1A, in some examples, there are no features, elements, etc. (along the travel path T) located between the fluid ejection device 110 and the belt 150. However, as schematically represented by the black dots X, in some examples the image formation device 100 may comprise additional features, elements, etc. located along the travel path T between the fluid ejection device 110 and the belt arrangement 150 including flexible belt 152. For instance, in some examples the image formation device 100 may comprise a charge emitter (e.g. located after the fluid ejection device 110) to emit electrostatic charges onto the deposited droplets 111 to cause electrostatic migration toward, and electrostatic fixation of, the ink particles 134 relative to the substrate, as further described in association with at least FIGS. 10-11.

Figure 2:
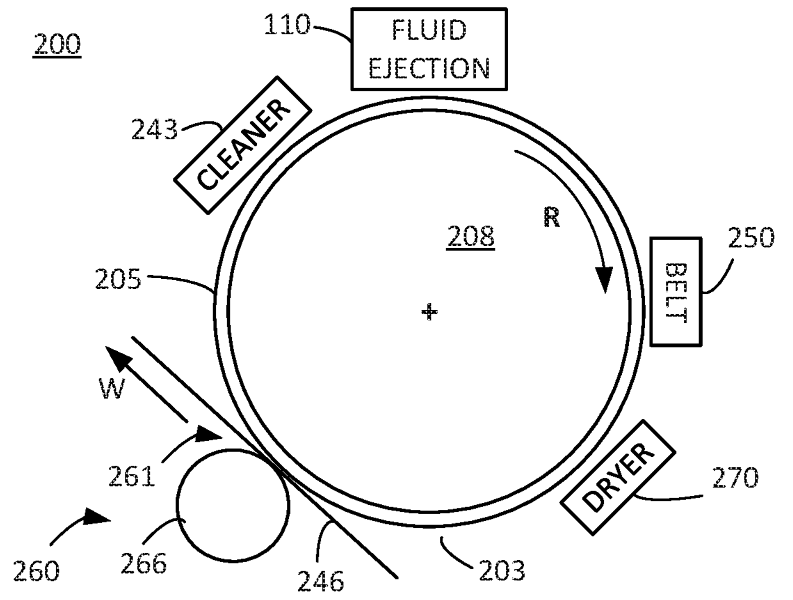
FIG. 2 is a diagram including a side view schematically representing an example image formation device including a rotatable drum-type substrate.

FIG. 2 is a diagram including a side view schematically representing an example image formation device 200. In some examples, the image formation device 200 comprises at least some of substantially the same features and attributes as the image formation device 100 in FIG. 1, while being implemented with a substrate 205 supported by a rotatable drum 208. In a manner consistent with FIG. 1A, the image formation device 200 comprises a fluid ejection device 110 and belt arrangement 250 arranged in series about an external surface of substrate 205 which rotates (as represented by arrow R). The rotating substrate 205 receives, via the fluid ejection device 110, deposited droplets 111 (of ink particles 134 within a liquid carrier 132) to at least partially form an intended image on the substrate 990. After such deposition, belt arrangement 250 removes at least a portion of the liquid carrier from the substrate 205. In some such examples, it will be understood that at this point in the process of forming an image on the substrate, the belt 152 is not acting to remove ink residue from substrate 105 in the same manner as is to be performed later by cleaner unit 243 after formation of the image on the substrate 105 has been fully completed, such as after media transfer station 260.

In some examples, the belt arrangement 250 may comprise at least some of substantially the same features and attributes as the belt arrangement 150 previously described in association with FIGS. 1A-1B and/or those belt arrangements later described in association with at least FIGS. 4A-11.

As further shown in FIG. 2, in some examples image formation device 200 may comprise a dryer 270 downstream from the belt arrangement 250 to further remove liquid (including but not limited to liquid carrier 132) from the substrate 205.

As further shown in FIG. 2, the image formation device 900 may comprise a media transfer station 260, which may comprise an impression roller or cylinder 266 which forms a nip 261 with drum 208 to cause transfer of the formed image on substrate 205 of drum 208 to print medium 246 moving along path W.

As further shown in FIG. 2, in some examples the image formation device 200 may comprise a cleaner unit 243, which follows the media transfer arrangement 260 and which precedes the fluid ejection device 110. The cleaner unit 245 is to remove any residual ink particles 132 and/or components of droplets 111 from the substrate 205 prior to operation of the fluid ejection device 110.

With regard to any of the examples involving a non-porous belt 152, the belt arrangement (e.g. 150 in FIG. 1A-1B, etc.) may be placed at a bottom 203 of a drum (e.g. 208 in FIG. 2) or at a lower portion of a belt-type substrate (e.g. FIG. 3) so that gravity may aid in the removal and collection of some of the liquid which may to accumulate (in small volumes) just prior to the leading edge of the contact zone CZ of the belt 152.

Figure 3:
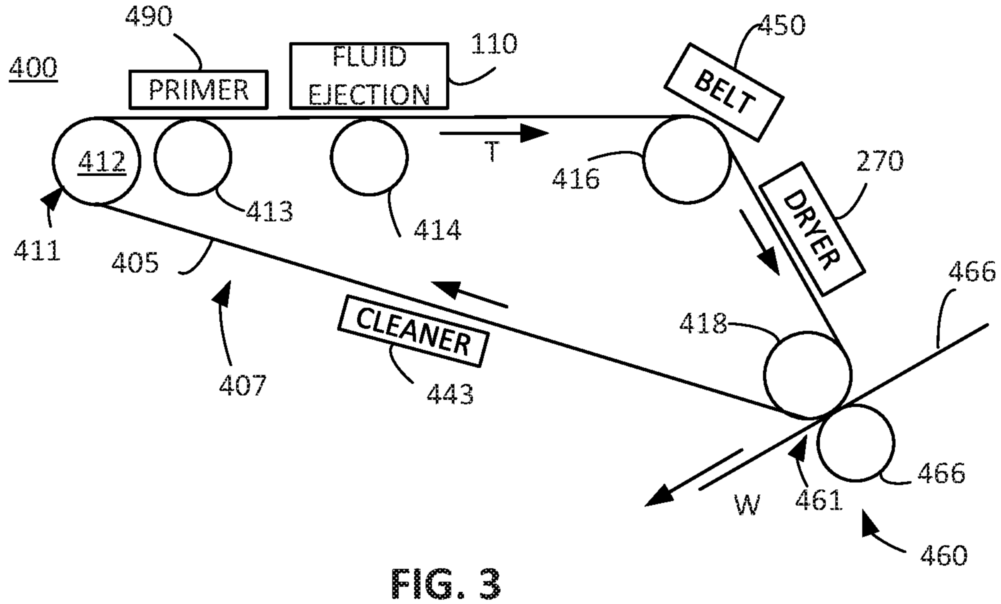
FIG. 3 is a diagram including a side view schematically representing an example image formation device including belt-type substrate.

FIG. 3 is a diagram including a side view schematically representing an example image formation device 400. In some examples, the image formation device 400 comprises at least some of substantially the same features and attributes as the image formation device 100 in FIGS. 1A-1B, except with a substrate 405 being implemented in an endless belt arrangement 407 (instead of a drum-type arrangement) among other differences noted below. As shown in FIG. 3, the substrate-belt arrangement 407 includes an array 411 of rollers 412, 414, 416, 418, with at least one of these respective rollers comprising a drive roller and the remaining rollers supporting and guiding the substrate 405. Via these rollers, the substrate 405 continuously moves in travel path T to expose the substrate 405 to at least the fluid ejection device 110 and belt arrangement 450, in a manner consistent with the devices as previously described in association with at least FIGS. 1A, 1B, and 2.

In a manner consistent with at least FIGS. 1A-1B, the image formation device 400 comprises a fluid ejection device 110 and belt arrangement 450 arranged along the travel path T through which the substrate 405 moves so that the substrate 405 may receive, via the fluid ejection device 110, deposited droplets 111 (of ink particles 134 within a liquid carrier 132) to at least partially form an intended image on the substrate 405. After such deposition, belt arrangement 450 removes at least a portion of the liquid carrier 132 from the substrate 405. In some examples, the belt arrangement 450 may comprise at least some of substantially the same features and attributes as the belt arrangement 150 previously described in association with FIGS. 1A-1B and/or those belt arrangements later described in association with at least FIGS. 4A-11.

As further shown in FIG. 3, in some examples image formation device 400 may comprise a dryer 270 downstream from the belt arrangement 450 to further remove liquid (including but not limited to liquid carrier 132) from the substrate 405. As further shown in FIG. 3, in some examples the image formation device 400 may comprise a media transfer station 460, which may comprise an impression roller or cylinder 466 which forms a nip 461 with roller 418 (e.g. a drum) to cause transfer of the formed image from substrate 405 at roller 418 onto print medium 466 moving along path W. As further shown in FIG. 3, in some examples the image formation device 400 may comprise a cleaner unit 443 which follows the media transfer arrangement 460 and which precedes at least the fluid ejection device 110. The cleaner unit 443 is to remove any residual ink particles 132 and/or components of droplets 111 from the substrate 405 prior to operation of the fluid ejection device 110.

As further shown in FIG. 3, in some examples the image formation device 400 comprises a primer unit 490 which precedes (i.e. is upstream from) the fluid ejection device 110 and which may deposit a primer layer or layer of binder material onto the substrate 405 and onto which the image may be formed, such as via operation of fluid ejection device 110, belt arrangement 450, dryer 270. In some examples, this primer layer or binder layer may be transferred with the formed image onto the print medium 466.

In some examples, such a primer unit 490 may be implemented in the image formation device 200 of FIG. 2 with the primer unit 490 being located between the cleaner unit 243 and the fluid ejection device 110.

Figure 4A:
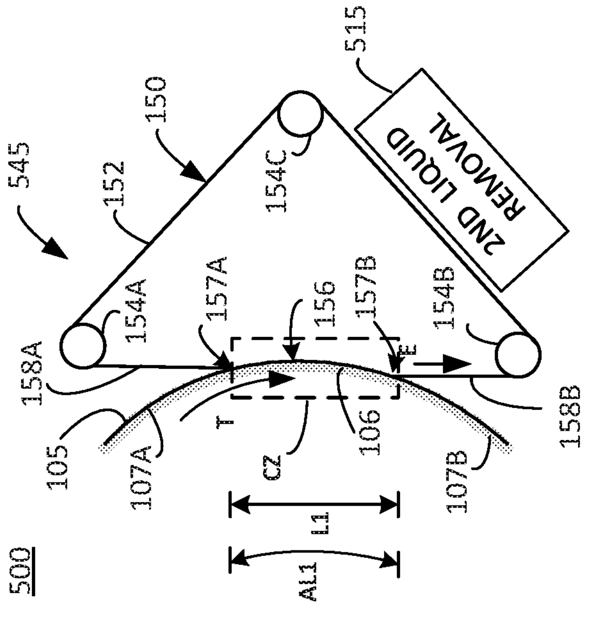
FIG. 4A is a diagram including a side view schematically representing an example belt arrangement for liquid removal from a substrate.

FIG. 4A is a diagram including a side view schematically representing a belt arrangement 500 for removing liquid from a substrate in an example image formation device. In some examples, the belt arrangement 500 comprises at least some of substantially the same features and attributes as, and/or an example implementation of, the belt arrangement 150 in FIGS. 1A-1B, 250 in FIGS. 2, and 450 in FIG. 3.

In some examples, the belt 152 may comprise a porous belt or may comprise a non-porous belt (act like squeegee).

As shown in FIG. 4A, in some examples the belt arrangement 150 comprises a second liquid removal element 515, which is located downstream from the contact zone CZ and which may be used to remove liquid from the belt 152. Removal of the liquid from portions of the belt 152 after it passes through the contact zone CZ prepares these portions of the belt 152 to again remove the liquid carrier 132 from the substrate 105 upon the next revolution (in endless loop/path E) of these portions in pressing contact against the substrate 105 in the contact zone CZ.

Figure 4C:
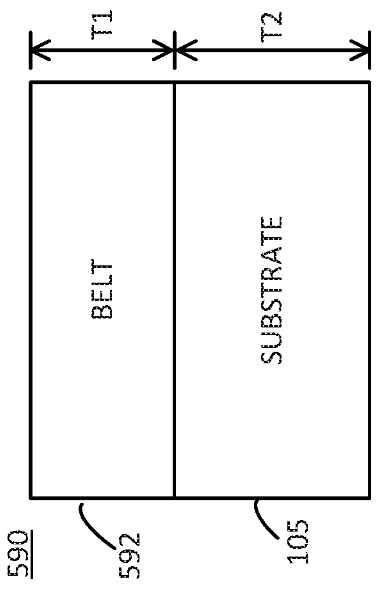
FIG. 4C is a diagram including a sectional view schematically representing an example belt and substrate of an example image formation device.
Figure 4B:
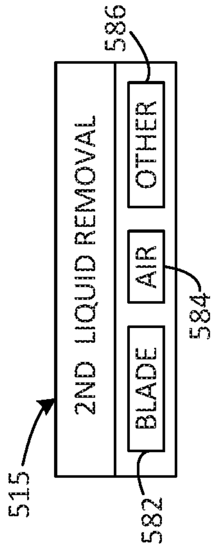
FIG. 4B is a block diagram schematically representing a second liquid removal element.

In some examples, as shown in FIG. 4B, the second liquid removal element 515 may comprise a blade 582, forced air 584, and/or other mechanical element 586 to further remove liquid from the belt 152. In some such examples, the blade 582 may be implemented in association with a support roller, squeegee, and the like.

FIG. 4C is a diagram including a sectional view schematically representing an example belt 592 and substrate 105 of an example image formation device, in which the belt 592 comprises one example implementation of belt 152. In some examples, the belt 592 may have a thickness (T1) of about 150 microns while the substrate 105 may have a thickness (T2) of about 1 millimeter, as shown in FIG. 4C. In some examples, belt 592 may be employed in the belt arrangement of the example image formation device as further described in association with FIG. 4A and/or belt 592 may be employed in the belt arrangement of the example image formation devices, as further described in association with FIGS. 6, 8.

In some examples, belt 592 may comprise a non-porous structure, which may comprise a polyimide material in some instances such that the belt 592 is strong, non-absorbing, and smooth. In some such examples, the belt 592 may comprise a single layer of a polyimide material. When the belt 592 comprises this non-porous structure, then the belt 592 removes the liquid carrier 132 from the substrate 105 by squeezing the liquid to the sides of the belt 592 before and during the contact zone CZ. In some examples, the second liquid removal element 515 (FIG. 2B) may be implemented as a blade located after the contact zone CZ to remove liquid from the belt 592 to prepare the belt 592 for its next revolution through the contact zone CZ for removing liquid from the substrate 105.

In some such examples, belt 592 may be used as belt 152 in the example image formation device 700 of FIG. 6, as further described later. In some examples, belt 592 may be used in the example image formation device 1000 of FIG. 9, as further described later.

Figure 5:
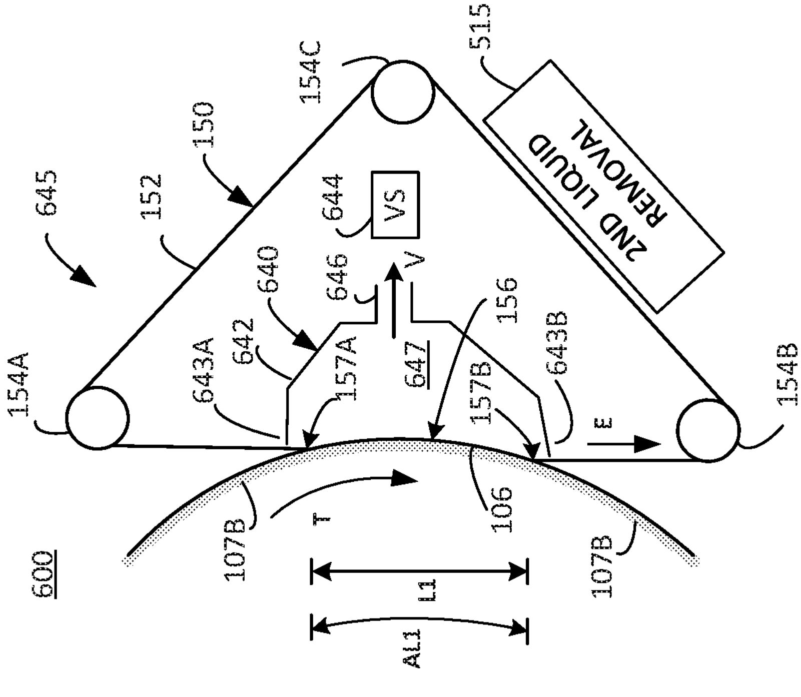
FIG. 5 is a diagram including a side view schematically representing an example belt arrangement for liquid removal from a substrate, and including a vacuum element.

FIG. 5 is a diagram 600 including a side view schematically representing an example liquid removal arrangement 645 including a belt arrangement 150 for removing liquid from a substrate 105 and including a vacuum arrangement 640. In some examples, the liquid removal arrangement 645 comprises at least some of substantially the same features and attributes as, and/or an example implementation of, the belt arrangement 150 in FIGS. 1A-1B, 250 in FIG. 2, 450 in FIG. 3, 545 in FIG. 4A, and 590 in FIG. 4B. As shown in FIG. 5, in some examples the vacuum arrangement 640 comprises a shell 642 defining a chamber 647 through which a vacuum (V) (e.g. negative pressure) is applied via a vacuum source (VS) 644, such as a negative pressure element. In one aspect, the vacuum arrangement 640 is located on a side of the belt 152 opposite from the arcuate portion 106 of the substrate 105 being engaged by the contact portion 156 of the belt 152, which is a location well-suited to directly and rapidly remove liquid from the belt 152, which was previously removed from the substrate 105 via belt 152. This arrangement is achieved, at least in part, by the intended absence of a support roller (e.g. 154A, 154B, 154C) in the contact zone CZ of the belt 152. This configuration, is in turn, achieved via aligning the rollers 154A, 154B relative to the arcuate portion 106 of the substrate 105 in a position which forces the segment 153 of belt 152 extending between rollers 154A, 154B into wrapping conformation contact against the arcuate portion 106 of substrate 105 to effectuate the contact portion 156 and contact zone CZ.

In some such examples, opposite end portions 643A, 643B of the shell 642 are spaced apart from each other by a distance greater than an arc length (AL1) of the contact portion 156, which enables the shell 642 to at least partially surround the contact portion 156 of the belt 150. Accordingly, a distance between the ends 643A, 643B generally correspond to a length (L1) of the contact zone CZ. In some examples, the applied vacuum pressure acts to draw liquid from the belt 152, which has been removed from the substrate 105 in the contact zone CZ via the pressing engagement of contact portion 156 of belt 152. The liquid drawn by the vacuum may be recycled, reused, and/or discarded depending on the type and/or volume of such liquid. It will be understood that FIG. 5 omits the dashed box CZ for illustrative simplicity and clarity but that the contact zone CZ is still present in the example image formation device of FIG. 5 in a manner similar to that shown in FIG. 4A.

In some such examples, the belt 152 comprises a porous belt to permit liquid to be drawn from, and through, the contact portion 156 of the belt 152 in the contact zone CZ. In some such examples, the belt 152 may comprise a single layer while in some examples, the belt 152 comprises a double layer structure where a backing layer of the belt 152 provides strength. In some examples, a top portion of the single layer structure or of a double layer structure may comprise a coating to further tune the belt 152 for its expected chemical interaction with the image on substrate 105 in order to minimize any effects on the formed image on substrate 105. In some such examples, the coating may comprise a low energy coating.

Figure 6:
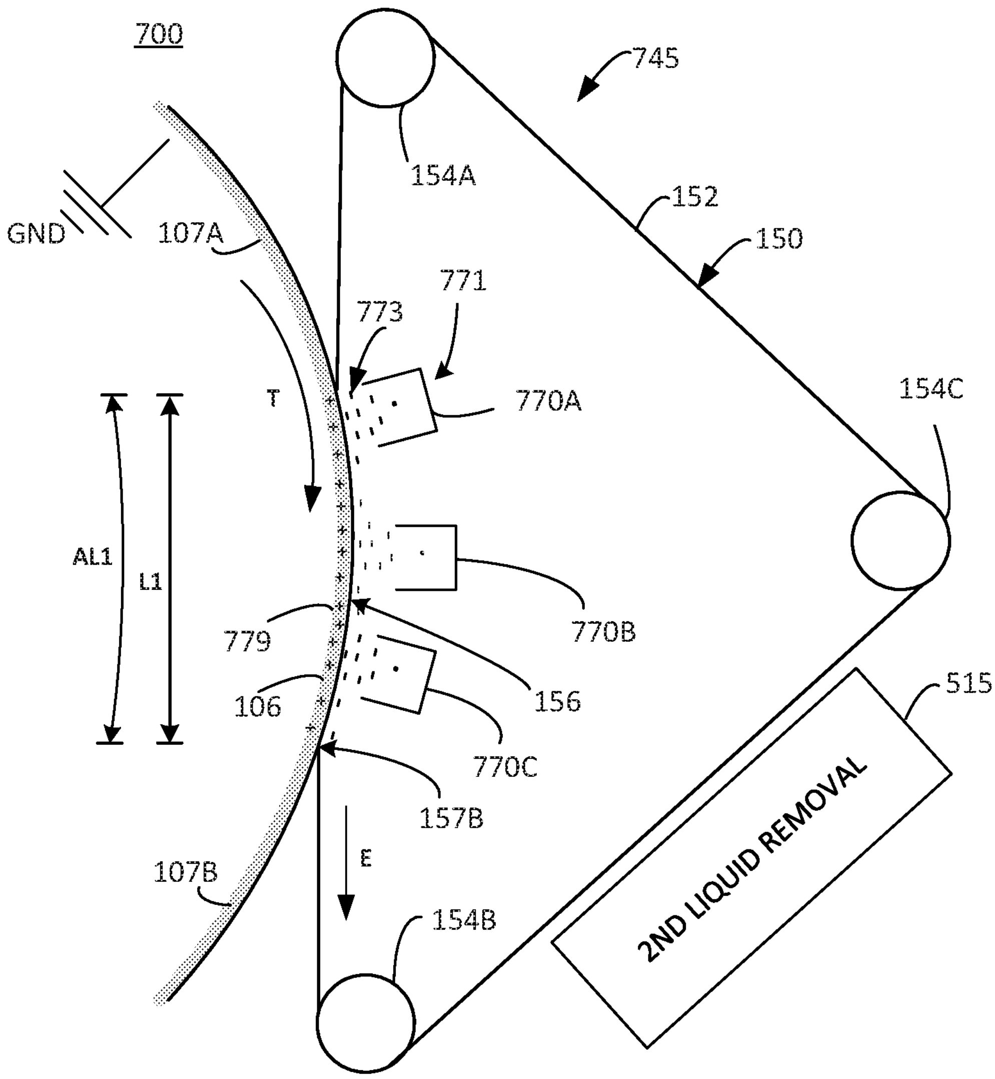
FIG. 6 is a diagram including a side view schematically representing an example belt arrangement for liquid removal from a substrate, and including charge emitting elements.

FIG. 6 is a diagram 700 including a side view schematically representing a liquid removal arrangement 745 for removing liquid from a substrate 105 in an example image formation device, and which includes a charge emitting element array 771 to facilitate engagement of belt 152 against substrate 105. In some examples, the liquid removal arrangement 745 comprises at least some of substantially the same features and attributes as, and/or an example implementation of, the belt arrangement 150 in FIGS. 1A-1B, 250 in FIG. 2, 450 in FIG. 3, 545 in FIG. 4A, and 590 in FIG. 4B, while further comprising the charge emitting element array 771.

As shown in FIG. 6, in some examples the charge emitting element array 771 comprises a plurality of charge emitting elements 770A, 770B, 770C spaced apart along the contact zone CZ and positioned to emit charges 773 onto the contact portion 156 of the belt 152. In some such examples, the substrate 105 may carry positive charges while the charge emitting elements 770A, 770B, 770C emit negative charges 773 as shown in FIG. 6. However, in some examples, the substrate 105 may carry a negative charges and the charge emitting elements 770A, 770B, 770C may emit positive charges.

With further reference to FIG. 6, each charge emitter (e.g. 770A, 770B, 770C) may comprise a corona, plasma element, or other charge generating element to generate a flow of charges. The charge emitter may sometimes be referred to as a charge source, charge generation device, and the like. The generated charges may be negative or positive as desired. In some examples, the charge emitter comprises an ion head to produce a flow of ions as the charges. It will be understood that the term "charges" and the term "ions" may be used interchangeably to the extent that the respective "charges" or "ions" embody a negative charge or positive charge (as determined by the emitters 770A, 770B, 770C).

In general terms, the emitted charges 773 act to at least partially control the pressure of the contact portion 156 of the belt 152 against the substrate 105 in the contact zone CZ. In particular, the emission of charges 773 onto the belt 152 is to cause electrostatic attraction of the belt 152 (in the contact zone CZ) against the substrate 105, which is grounded (e.g. GND) via a conductive backing and which exhibits positive charges 779 in at least the arcuate contact portion 106 of the substrate 105. In some examples, this pressure, which is at least partially caused by the electrostatic attraction, may comprise pressures up to the order of 100,000 Pascals. In some examples, the pressure may comprise up pressures up to the order of 90,000 Pascals, while in some examples the pressure may comprise up to the order of 80,000 Pascals. In some examples the pressure may comprise up to the order of 70,000 Pascals.

In some examples, when charging the belt 152 via emitted charges, a maximum voltage of the charge emitters may comprise on the order of 2 kiloVolts. In some such examples, for a belt 152 having a thickness T1 (e.g. FIG. 4C) of 150 microns and a dielectric constant of 3, a maximum charge/area may comprise about 0.4 $10^3$ Coulumb/$m^2$ and a pressure on the order of $7\times10^3$ Pascals. In another example, assuming the belt 152 has a dielectric constant of 30, a thickness T1 of 150 microns, and a dielectric thickness of 5 microns, then with a maximum voltage (for the charge emitters) of 2 kiloVolts, a maximum charge/area may comprise about 4×10 3 Coulumb/$m^2$ and a pressure of $7\times10^5$ Pascals.

In general terms, a different dielectric strength of the belt 152 may be selected depending on the various materials and structures forming the belt 152. In some examples, a belt 152 comprising a parylene material may comprise a dielectric strength of about 200 Volts/micron while in some examples, a belt 152 comprising a polyimide material may comprise a dielectric strength of about 100 Volts/micron. Meanwhile, in some examples in which the belt 152 comprises various plastic materials, the dielectric strength may comprise on the order of tens of V/micron. With such dielectric strengths, the applied voltage will not result in a breakdown through the belt 152. For instance, with an applied voltage of 2 kiloVolts (via applied charges 773) on a belt 152 having a thickness of 150 microns, the electric field across the belt 152 may comprise about 13 Volts/microns, which is at a level unlikely to cause deterioration of the belt 152 due to applied charges 773.

In some examples, the belt 152 may comprise a resistivity tuned to achieve a response time (to discharge the applied charges) on the order of a few milliseconds (e.g. 3, 4, 5) so as to avoid immediate discharge of the belt. In some such examples, this response time is applicable for a contact portion 156 having an arc length (AL1) of about 10 to about 20 centimeters and a belt speed of about 1 meter/seconds. Given this relatively quick response time of the belt 152, several charge emitters 770A, 770B, 770C are arranged in series in a spaced apart relationship to ensure that enough charges 773 are emitted onto the belt 152 over the arc length (AL1) of the contact portion 156 to ensure it remains sufficiently charged to result in the desired electrostatic attraction (relative to substrate 105) to create the desired pressure of the contact portion 156 of the belt 152 against the substrate 105.

In some examples, the response time of the belt 105 may be on the order of tens of milliseconds, assuming a contact portion of about 10 to about 20 centimeters and a belt speed of 1 meter/second. In some such examples, just the first charge emitter 770A (and emitters 770B, 770C) may be implemented since the response time of the belt 152 (to discharge the applied charges) is slow enough for the charges 773 to remain in and/or on the contact portion 156 of belt 105 through the length (L1) of the contact zone CZ to achieve the desired electrostatic attraction and pressure of belt 152 against substrate 105. However, in some such examples, the response time of the belt 105 is less than 100 milliseconds, assuming a contact portion of about 10 to about 20 centimeters and a belt speed of 1 meter/second, to facilitate recombination of the charges not long after a given portion of the belt 152 leaves the contact zone CZ.

Figure 7A:
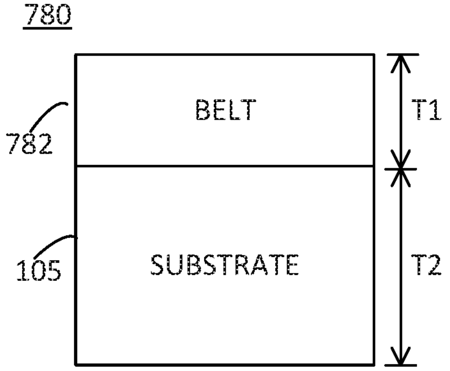
FIG. 7A is a diagram including a sectional view schematically representing an example belt and substrate of an example image formation device.

In some examples of the arrangement in the example of FIG. 6, the belt 152 may comprise a porous belt such as the belt 782 in FIG. 7A, or may comprise a non-porous belt.

In one aspect, the charge emitters 770A, 770B, 770C are located on a side of the belt 152 opposite from the arcuate portion 106 of the substrate 105 being engaged by the contact portion 156 of the belt 152, which is a location well-suited to directly and rapidly remove liquid from the belt 152 which was in turn removed from the substrate 105. This arrangement is achieved, at least in part, by the intended absence of a support roller (e.g. 154A, 1548, 154C) in the contact zone CZ of the belt 152. This configuration, is in turn, achieved via aligning the rollers 154A, 154B relative to the arcuate portion 106 of the substrate 105 in a position which forces the segment 153 of belt 152 extending between rollers 154A, 154B into wrapping conformation contact against the arcuate portion 106 of substrate 105 to effectuate the contact portion 156 and contact zone CZ.

FIG. 7A is a diagram 780 including a sectional view schematically representing an example belt 782 of a liquid removal arrangement and an example substrate 105 of an example image formation device. In some examples, belt 782 may be used as the belt 152 of belt arrangement 150 of liquid removal arrangement 745 in FIG. 6, while in some examples, belt 782 may be used as the belt 152 of belt arrangement 150 of liquid removal arrangement 945 in FIG. 8. The belt 782 may comprise a single layer as shown in FIG. 7A, or may comprise several layers having an overall resistivity which is substantially the same as a resistivity of a single layer. In some examples, a conductivity of the belt 782 may be tuned to have a discharge response time across a thickness (T1) of belt 782 slower than a few tens of millimeters, depending on the arc length (AL1) of the contact zone CZ. For instance, if the contact zone CZ has an arc length (AL1) of about 10 centimeters to about 20 centimeters, and a speed of 1 meter/second, then in some examples the discharge response time may be greater than a few tens of milliseconds, and less than the belt period time which is a circumference of belt 782 (e.g. belt 152) divided by the belt speed which can be on the order of 100's of milliseconds. In some examples, the resistivity of the belt 152 may be on the order of 10/\11-10/\12 ohm-cm).

Figure 7B:
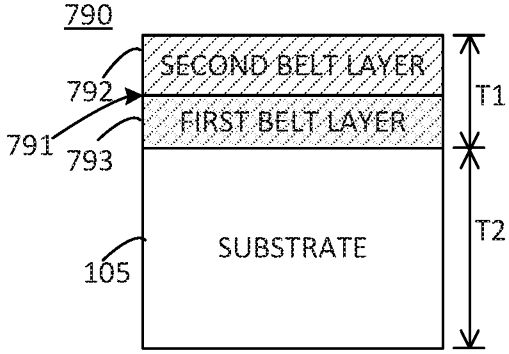
FIG. 7B is a diagram including a sectional view schematically representing an example belt and substrate of an example image formation device.

FIG. 7B is a diagram 790 including a sectional view schematically representing an example belt 791 of a liquid removal arrangement and an example substrate 105 of an example image formation device. In some examples, the belt 791 may comprise a porous belt. Accordingly, in some examples, belt 791 may be used as the belt 152 of belt arrangement 150 of liquid removal arrangement 745 in FIG. 6, while in some examples, belt 782 may be used as the belt 152 of belt arrangement 150 of liquid removal arrangement 945 in FIG. 8. In some examples, the belt 791 may comprise a double layer such as layers 792 and 793 as shown in FIG. 7B. The first layer 793 (to contact the substrate 784) may comprise a porous layer and the second layer 792 may comprise a porous layer as well. In some such examples, the first layer 793 may comprise an electrically insulative layer or a partially conductive layer, while the second layer 792 may comprise a support layer. However, in some examples, the belt 791 may comprise a single layer, such as a mesh fiber structure that is both porous and strong. In a manner similar to that described in previous examples, the resistivity of the belt 791 may be tuned to get the desired response time.

In some examples, the second layer 792 (e.g. a support layer) may be conductive, such as having a resistivity less than 10/\6 ohm-cm, such as but not limited to examples in which support rollers (e.g. 154A, 154B, 154C in FIGS. 6, 8) are in an electrically floating configuration and the layer 792 is conductive enough to keep a constant voltage in the contact zone CZ. As noted in the example of FIGS. 6 and 9, one charge emitter (e.g. 770A) will suffice to maintain enough electrostatic charge on the contact portion 156 of the belt 152, and therefore achieve sufficient electrostatically-induced pressure of belt 152 against the substrate 105.

However, in some examples, the second layer 792 (e.g. a support layer) may be conductive, such that a 2 kiloVolt charge may be provided directly to the belt 791 from a power supply via a conductive brush.

Figure 8:
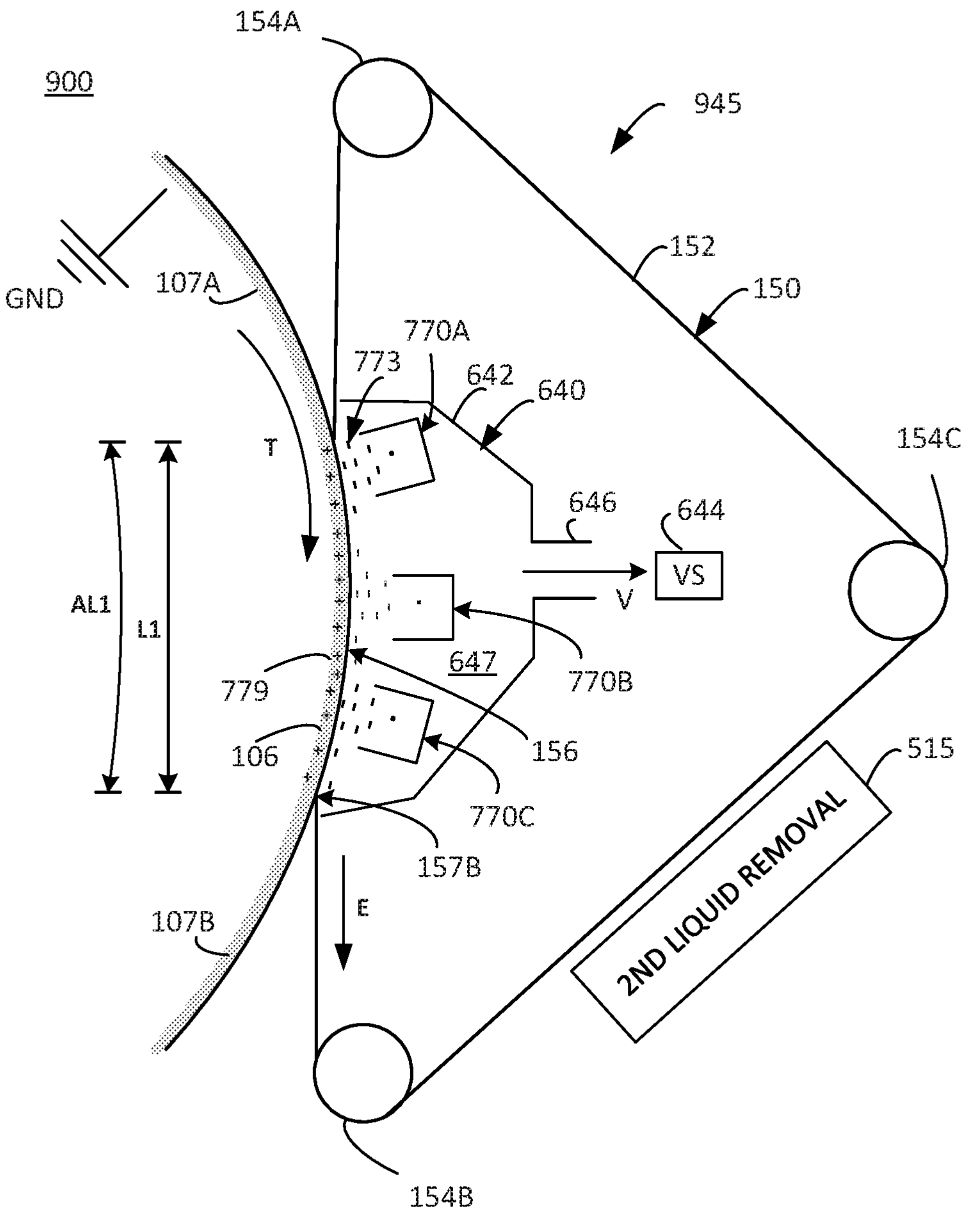
FIG. 8 is a diagram including a side view schematically representing an example belt arrangement for liquid removal from a substrate, and including charge emitting elements and a vacuum element.

FIG. 8 is a diagram 900 including a side view schematically representing a liquid removal arrangement 945 for removing liquid from a substrate 105 in an example image formation device. In some examples, the liquid removal arrangement 945 comprises at least some of substantially the same features and attributes as, and/or an example implementation of, the belt arrangement 150 in FIGS. 1A-1B, 250 in FIG. 2, 450 in FIG. 3, 545 in FIG. 4A, and 590 in FIG. 4B, while further comprising both the charge emitting element array 770 of the liquid removal arrangement of 745 of FIG. 6 and the vacuum arrangement 640 of the liquid removal arrangement 645 of FIG. 5. Accordingly, the liquid removal arrangement 945 may enhance the removal of liquid from substrate 105 by belt 152 by the assistance of electrostatically-enhanced application (via the charge emitters 770A, 770B, 770C) of pressurized contact of belt 152 against the substrate 105 and by the assistance of the vacuum arrangement 640 to remove liquid from the contact portion 156 of the belt 152. Via this combined arrangement, contact of the belt 152 against the substrate 105 is ensured while large volumes of liquid can be rapidly removed from the substrate 105 in an efficient, effective manner. As in the example of FIGS. 4A, and 5-7, the liquid removal arrangement 945 also may comprise a second liquid removal element 515 to further remove liquid from the belt 152 after the contact zone CZ.

In some such examples, the belt 152 comprises a porous belt to facilitate liquid to be drawn from, and through, the contact portion 156 of the belt 152 in the contact zone CZ.

Figure 9:
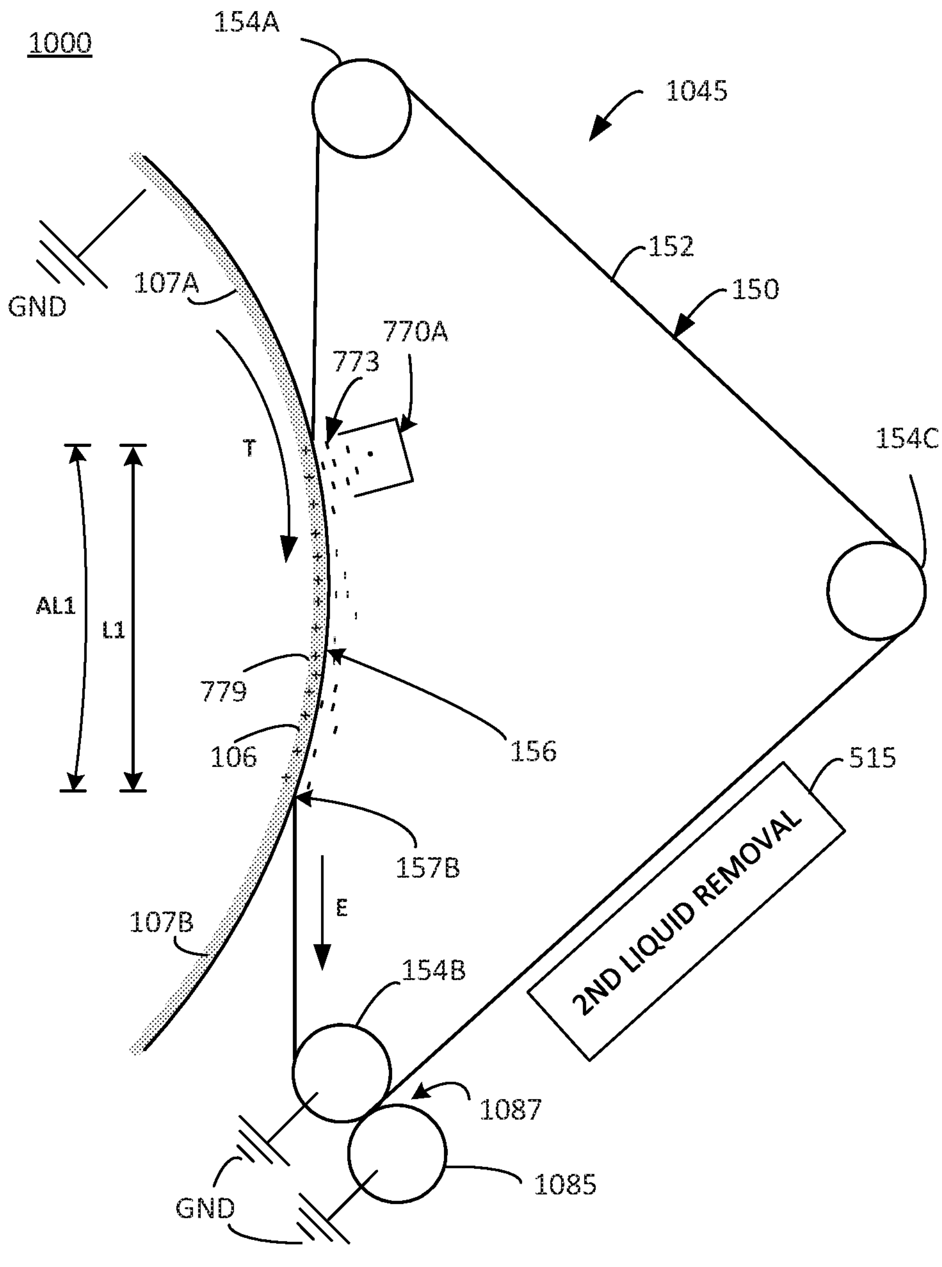
FIG. 9 is a diagram including a side view schematically representing an example belt arrangement for liquid removal from a substrate, and including a charge emitting element and a discharge element.

FIG. 9 is a diagram including a side view schematically representing a liquid removal arrangement 1045 for removing liquid from a substrate 105 in an example image formation device. In some examples, the liquid removal arrangement 1045 comprises at least some of substantially the same features and attributes as, and/or an example implementation of, the belt arrangement 150 in FIGS. 1A-1B, 250 in FIG. 2, 450 in FIG. 3, 545 in FIG. 4A, and 590 in FIG. 4B, while further comprising a charge emitting element 770A (e.g. such as element 770A of the liquid removal arrangement of 745 of FIG. 6) and a discharge element 1085. In some such examples, as in the previous examples associated with FIGS. 6 and 8, the single charge emitting element 770A may emit charges to cause electrostatic attraction of contact portion 156 of belt 105 to substrate 105 with the response time of the belt 152 being slow enough such that just a single charge emitting element 770A may apply enough charges 773 to maintain sufficient electrostatic attraction of contact portion 156 of belt 152 against substrate 105 throughout the arc length (AL1) of the contact zone CZ. In some such examples, the response time of the belt 152 may be greater than a few tens of milliseconds, such as when the arc length of the contact portion 156 comprises about 10 to about 20 centimeters and the belt speed is about 1 meter/second. In some such examples, the belt 152 comprises a non-conductive belt having a resistivity greater than 10-8 ohm-cm.

However, in order to ensure that such charges 773 become sufficiently discharged after the contact zone CZ, in some examples the liquid removal arrangement 1045 may comprise a discharge element 1085. As shown in FIG. 9, the discharge element 1085 may comprise a conductive roller or drum forming a nip 1087 or may otherwise be in movable contact against a roller of the belt arrangement 150, such as roller 154B, with both the discharge roller 1085 and roller 154B being connected to ground GND. As belt 152 moves through nip 1087, any remaining charges on belt 152 will become discharged to help the belt 152 return to neutral state.

In some examples, the liquid removal arrangement 1045 may comprise additional charge emitting elements such as charge emitting elements 770B and/or 770C in FIGS. 6 and 8 to enhance pressurized application of belt 152 again substrate 105, depending on the relative speed of the response time of the belt 152.

FIG. 10 is a diagram schematically representing an example image formation device 1100. In some examples, the image formation device 1100 comprises an example image formation device comprising at least some of substantially the same features and attributes as, and/or an example implementation of, the liquid removal arrangement 150 (FIGS. 1A-1B), 250 (FIG. 2), 450 (FIG. 3), 545 (FIG. 4A), 645 (FIG. 5), 745 (FIG. 6), 945 (FIG. 8), 1045 (FIG. 9), 1100 (FIG. 10), and/or 1200 (FIG. 11). Moreover, the image formation device 1100 comprises at least some of substantially the same features and attributes as the image formation devices described in association with FIGS. 1A, 2, 3. Moreover, in some examples, downstream from the fluid ejection device 110, the image formation device 1100 may comprise a charge emitter 1140 to emit charges onto deposited droplets 111 (of ink particles 134 within a liquid carrier 132) to cause electrostatic migration of the ink particles 134 through the liquid carrier 132 toward the substrate 105 as shown in portion 1122 of FIG. 10, and to cause electrostatic fixation of the ink particles 134 against the substrate 105, as shown in portion 1124 of FIG. 10. In some examples, the liquid carrier 132 may comprise a non-aqueous fluid, which in some examples may comprise a low viscosity, dielectric oil, such as an isoparaffinic fluid. Some versions of such dielectric oil may be sold under the trade name Isopar®. Among other attributes, the non-aqueous liquid carrier may be more easily removed from the substrate 105, at least to the extent that the substrate 105 may comprise some aqueous absorptive properties.

As further shown in dashed box B of portion 1122 of FIG. 10, the deposited charges 1143 become attached to the deposited ink particles 134, which then migrate to substrate 105 due to the electrostatic forces of the charges 1143 being attracted to the grounded substrate 105. Moreover, as shown in dashed box C in portion 1124 of FIG. 10, upon all of the deposited ink particles 134 (with attached charges 1143) becoming electrostatically fixed relative to the substrate 105, the liquid carrier 132 exhibits a supernatant relationship relative to the ink particles 134, which are electrostatically fixed against the substrate 105. With the liquid carrier 132 in this arrangement, the liquid carrier 132 can be readily removed from the substrate 105 without disturbing (or without substantially disturbing) the electrostatically fixed ink particles 134 in their desired, targeted position on the substrate 105 by which an image is at least partially formed. With this in mind, the liquid removal arrangement 1145 acts to remove the liquid carrier 132 from the substrate 105 in a manner consistent with the previously described examples of a liquid removal arrangement, such as but not limited to liquid removal arrangement 150 (FIGS. 1A-1B), 250 (FIG. 2), 450 (FIG. 3), 545 (FIG. 4A), 645 (FIG. 5), 745 (FIG. 6), 945 (FIG. 8), 1045 (FIG. 9), 1100 (FIG. 10), and/or 1200 (FIG. 11).

With further reference to FIG. 10, the charge emitter 1140 may comprise a corona, plasma element, or other charge generating element to generate a flow of charges. The charge emitter 1140 may sometimes be referred to as a charge source, charge generation device, and the like. The generated charges may be negative or positive as desired. In some examples, the charge emitter 1140 comprises an ion head to produce a flow of ions as the charges. It will be understood that the term "charges" and the term "ions" may be used interchangeably to the extent that the respective "charges" or "ions" embody a negative charge or positive charge (as determined by emitter 1140).

In the particular instance shown in FIG. 10, the emitted charges 1143 can become attached to the ink particles 134 to cause all of the charged ink particles to have a particular polarity, which will be attracted to ground. In some such examples, all or substantially all of the charged ink particles 134 will have a negative charge or alternatively all or substantially all of the charged ink particles 134 will have a positive charge.

FIG. 11 is a diagram including a side view schematically representing an example image formation device 1200, which comprises at least one example implementation of the image formation device 1100 of FIG. 10. In some examples, the image formation device 1200 comprises at least some of substantially the same features and attributes as image formation device 200 in FIG. 2, while further comprising a charge emitter 1140 located along the travel path T of substrate 105 (on rotatable drum 208) between the fluid ejection device 110 and the belt arrangement 250. In a manner similar to that represented in FIG. 10, the charge emitter 1140 emits charges (e.g. 1143 in FIG. 10) to cause electrostatic migration of the ink particles 134 through the liquid carrier 132, and electrostatic fixation of, ink particles 134 relative to substrate 105 in manner described in association with FIG. 10. As in the example of FIG. 10, the liquid carrier 132 may be a non-aqueous fluid.

With regard to both of the examples described in association with FIGS. 10 and 11 in which the charge emitter 1140 may be implemented with example liquid removal arrangements associated with FIGS. 6, 8, 9, the polarity of charges 773 emitted by emitters 770A, 770B, 770C (to cause pressurized contact of belt 152 against substrate 105) may be selected to be the same polarity of charges 1143 emitted by the emitter 1140 (for electrostatic fixation) upstream from the liquid removal arrangement. By doing so, the emitted charges 773 may enhance the electrostatic fixation of the ink particles 134 (relative to the substrate 105) which was first caused by the charges 1143.

Figure 12A:
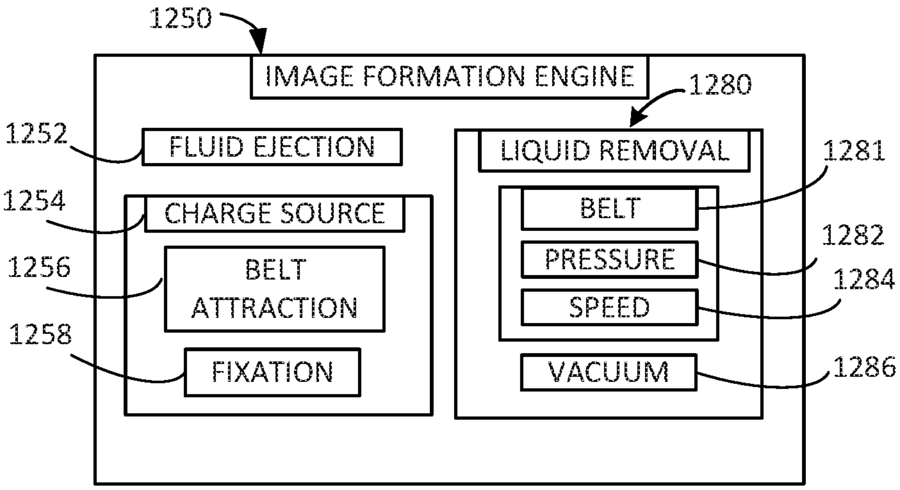
FIG. 12A is a block diagram schematically representing an example image formation engine.

FIG. 12A is a block diagram schematically representing an example image formation engine 1250. In some examples, the image formation engine 1250 may form part of a control portion 1400, as later described in association with at least FIG. 12B, such as but not limited to comprising at least part of the instructions 1411. In some examples, the image formation engine 1250 may be used to implement at least some of the various example devices and/or example methods of the present disclosure as previously described in association with FIGS. 1-11 and/or as later described in association with FIGS. 12B-13. In some examples, the image formation engine 1250 (FIG. 12A) and/or control portion 1400 (FIG. 12B) may form part of, and/or be in communication with, an image formation device.

In general terms, the image formation engine 1250 is to control at least some aspects of operation of the image formation devices and/or methods as described in association with at least FIGS. 1-11 and 12B-13.

As shown in FIG. 12A, the image formation engine 1250 may comprise a fluid ejection engine 1252, a charge source engine 1254, and/or a liquid removal engine 1280.

In some examples, the fluid ejection engine 1252 controls operation of the fluid ejection device 110 (e.g. at least FIG. 1) to deposit droplets of ink particles 134 within a liquid carrier 132 onto a substrate 105 (e.g. at least FIG. 1) as described throughout the examples of the present disclosure.

In some examples, the charge emitter engine 1254 comprises a belt attraction parameter 1256 to control operation of the charge emitter(s) (e.g. 770A, 770B, 770C in FIGS. 6, 8) to cause electrostatic attraction of the control portion 156 of belt 152 against the substrate 105 to at least partially control a pressure of the contact portion 156 of belt 152 against the substrate 105. This arrangement may facilitate liquid removal from the substrate 105 and/or further liquid removal from the belt 152 after the liquid has been removed from the substrate 105. In some such examples, the belt attraction parameter 1256 and/or portion of the charge emitter engine 1254 may cooperate with, and/or form part of, the liquid removal engine 1280 to the extent that the charge emitters facilitate liquid removal via the pressurized contact of belt 152 relative to the substrate 105.

In some examples, the charge emitter engine 1254 comprises a fixation parameter 1258 to control operation of a charge emitter (e.g. 1140 in FIGS. 10, 11) to emit airborne electrical charges to induce electrostatic migration of ink particles 134 toward the substrate 105 and electrostatic fixation of the migrated ink particles 134 at their target locations in a pattern at least partially forming an image, such as described in association with FIGS. 10-11 and/or various examples throughout the present disclosure.

In some examples, in general terms the liquid removal engine 1280 controls operation of at least a liquid removal arrangement to remove the liquid carrier 132 from the substrate 105. Such control may comprise control of operation of at least the various elements, portions, aspects of the liquid removal throughout the examples of the present disclosure, such as but not limited to the examples of 150 (FIGS. 1A-1B), 250 (FIG. 2), 450 (FIG. 3), 545 (FIG. 4A), 645 (FIG. 5), 745 (FIG. 6), 945 (FIG. 8), 1045 (FIG. 9), 1100 (FIG. 10), and/or 1200 (FIG. 11).

In some examples, the liquid removal engine 1280 comprises a belt engine 1281, which may comprise pressure parameter 1282 by which a pressure of the belt (e.g. 152 in FIG. 1A) is controlled (and/or tracked) via various elements such as but not limited to, a positioner (P) and/or tensioner (175) in FIG. 1B, charge emitters (e.g. 770A, 770B, 770C in FIGS. 6,8), the support rollers (e.g. 154A, 154B, 154C), and/other elements described throughout FIGS. 1A-11 related to applying and/or controlling the belt pressure.

In some examples, the belt engine 1281 may comprise a speed parameter 1284 by which a speed of the belt (e.g. 152 in FIG. 1A) is controlled (and/or tracked) via operation of the support and/or drive rollers of one of the various example belt arrangements described in association with at least FIGS. 1A-11.

In some examples, the liquid removal engine 1280 may comprise a vacuum parameter 1286 to control (and/or track) a vacuum pressure (e.g. negative pressure) applied to the contact portion 156 of the belt 152 to remove liquid from the belt 152, such as described in association with FIGS. 5, 8.

It will be understood that, in at least some examples, the image formation engine 1250 is not strictly limited to the particular grouping of parameters, engines, functions, etc. as represented in FIG. 12A, such that the various parameters, engines, functions, etc. may operate according to different groupings than shown in FIG. 12A.

Figure 12B:
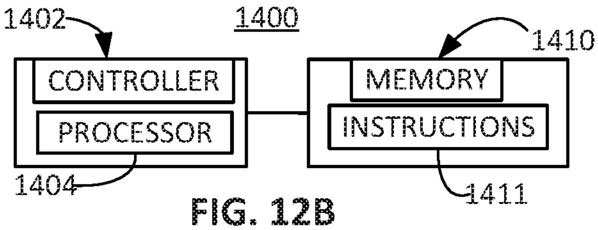
FIG. 12B is a block diagram schematically representing an example control portion.

FIG. 12B is a block diagram schematically representing an example control portion 1400. In some examples, control portion 1400 provides one example implementation of a control portion forming a part of, implementing, and/or generally managing the example image formation devices, as well as the particular portions, fluid ejection devices, charge emitters, belts, vacuums, liquid removal elements, elements, devices, user interface, instructions, engines, parameters, functions, and/or methods, as described throughout examples of the present disclosure in association with FIGS. 1-12A and 12C-13.

In some examples, control portion 1400 includes a controller 1402 and a memory 1410. In general terms, controller 1402 of control portion 1400 comprises at least one processor 1404 and associated memories. The controller 1402 is electrically couplable to, and in communication with, memory 1410 to generate control signals to direct operation of at least some the image formation devices, various portions and elements of the image formation devices, such as fluid ejection devices, charge emitters, belts, vacuums, liquid removal elements, user interfaces, instructions, engines, functions, and/or methods, as described throughout examples of the present disclosure. In some examples, these generated control signals include, but are not limited to, employing instructions 1411 stored in memory 1410 to at least direct and manage depositing droplets of ink particles and liquid carrier to form an image on a media, jetting droplets, directing charges onto ink particles, removing liquids (e.g. via a belt, charge emitters, vacuum, dryer, etc.), etc. as described throughout the examples of the present disclosure in association with FIGS. 1-12A and 12C-13. In some instances, the controller 1402 or control portion 1400 may sometimes be referred to as being programmed to perform the above-identified actions, functions, etc. In some examples, at least some of the stored instructions 1411 are implemented as a, or may be referred to as, a print engine, an image formation engine, and the like, such as but not limited to the image formation engine 1250 in FIG. 12A.

In response to or based upon commands received via a user interface (e.g. user interface 1420 in FIG. 12C) and/or via machine readable instructions, controller 1402 generates control signals as described above in accordance with at least some of the examples of the present disclosure. In some examples, controller 1402 is embodied in a general purpose computing device while in some examples, controller 1402 is incorporated into or associated with at least some of the image formation devices, portions or elements along the travel path, fluid ejection devices, charge emitters, belts, vacuums, liquid removal elements, user interfaces, instructions, engines, functions, and/or methods, etc. as described throughout examples of the present disclosure.

For purposes of this application, in reference to the controller 1402, the term "processor" shall mean a presently developed or future developed processor (or processing resources) that executes machine readable instructions contained in a memory or that includes circuitry to perform computations. In some examples, execution of the machine readable instructions, such as those provided via memory 1410 of control portion 1400 cause the processor to perform the above-identified actions, such as operating controller 1402 to implement the formation of an image as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 1410. The machine readable instructions may include a sequence of instructions, a processor-executable machine learning model, or the like. In some examples, memory 1410 comprises a computer readable tangible medium providing non-volatile storage of the machine readable instructions executable by a process of controller 1402. In some examples, the computer readable tangible medium may sometimes be referred to as, and/or comprise at least a portion of, a computer program product. In other examples, hard wired circuitry may be used in place of or in combination with machine readable instructions to implement the functions described. For example, controller 1402 may be embodied as part of at least one application-specific integrated circuit (ASIC), at least one field-programmable gate array (FPGA), and/or the like. In at least some examples, the controller 1402 is not limited to any specific combination of hardware circuitry and machine readable instructions, nor limited to any particular source for the machine readable instructions executed by the controller 1402.

In some examples, control portion 1400 may be entirely implemented within or by a stand-alone device.

In some examples, the control portion 1400 may be partially implemented in one of the image formation devices and partially implemented in a computing resource separate from, and independent of, the image formation devices but in communication with the image formation devices. For instance, in some examples control portion 1400 may be implemented via a server accessible via the cloud and/or other network pathways. In some examples, the control portion 1400 may be distributed or apportioned among multiple devices or resources such as among a server, an image formation device, and/or a user interface.

Figure 12C:
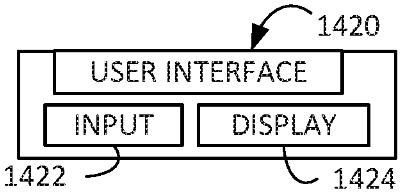
FIG. 12C is a block diagram schematically representing an example user interface.

In some examples, control portion 1400 includes, and/or is in communication with, a user interface 1420 as shown in FIG. 12C. In some examples, user interface 1420 comprises a user interface or other display that provides for the simultaneous display, activation, and/or operation of at least some of the image formation devices, portions thereof, elements, user interfaces, instructions, engines, functions, and/or methods, etc. as described in association with FIGS. 1-12B and 13. In some examples, at least some portions or aspects of the user interface 1420 are provided via a graphical user interface (GUI), and may comprise a display 1424 and input 1422.

Figure 13:
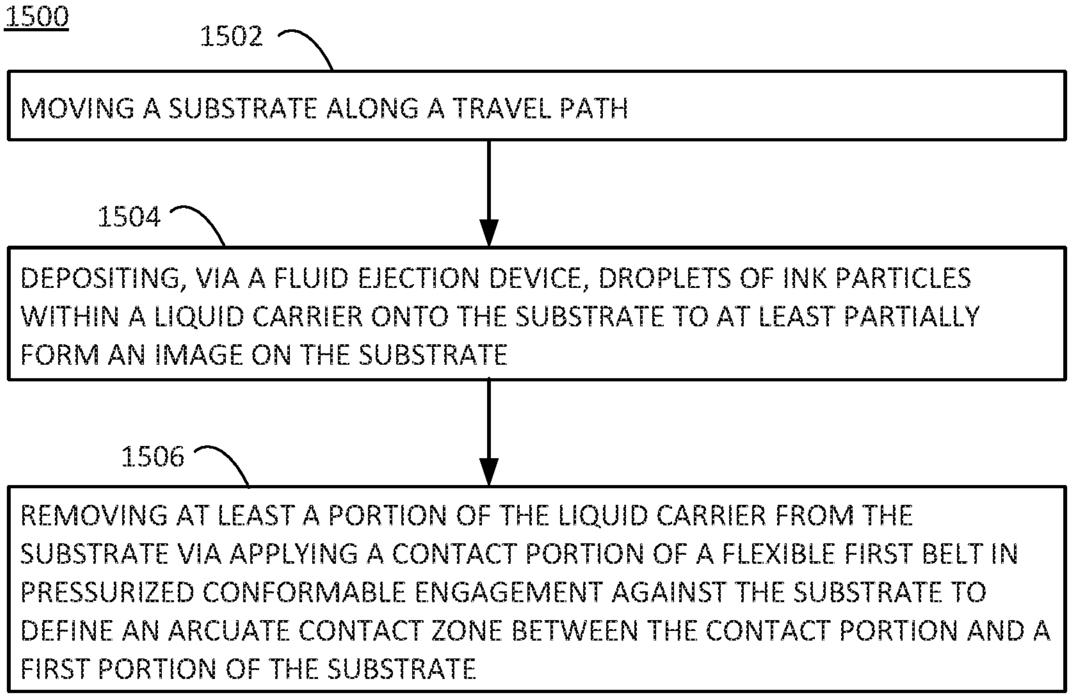
FIG. 13 is a flow diagram schematically representing an example method of image formation.

FIG. 13 is a flow diagram schematically representing an example method. In some examples, method 1500 may be performed via at least some of the same or substantially the same image formation devices, portions, fluid ejection devices, charge emitters, belts, vacuums, liquid removal elements, elements, control portion, user interface, etc. as previously described in association with FIGS. 1-12C. In some examples, method 1500 may be performed via at least some of the same or substantially the same image formation devices, portions, fluid ejection devices, charge emitters, belts, vacuums, liquid removal elements, elements, control portion, user interface, etc. other than those previously described in association with FIGS. 1-12C.

As shown at 1502 in FIG. 13, in some examples method 1500 may comprise moving a substrate along a travel path. As shown at 1504 in FIG. 13, method 1500 may comprise depositing, via a fluid ejection device, droplets of ink particles within a liquid carrier onto the substrate to at least partially form an image on the substrate.

As shown at 1506 in FIG. 13, method 1500 may comprise removing at least a portion of the liquid carrier from the substrate via applying a contact portion of a flexible first belt in pressured conformable engagement against the substrate to define an arcuate contact zone between the contact portion and a first portion of the substrate.

In some such examples, method 1500 may further comprise supporting the belt via a plurality of rollers spaced apart from each other along a length of the belt, wherein the rollers are positioned in locations other than the contact zone.

In some such examples, method 1500 may further comprise at least one of: emitting, via at least one charge emitter on a side of belt opposite the support/substrate in the contact zone, emit airborne charges onto the contact portion of the belt; and applying a vacuum on the side of the belt opposite the substrate in the contact zone to remove the liquid carrier from the belt.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An image formation device comprising:

a support to support movement of a substrate along a travel path;

a fluid ejection device along the travel path to deposit droplets of ink particles within a liquid carrier onto the substrate to at least partially form an image on the substrate;

a flexible belt located downstream along the travel path from the fluid ejection device and including a contact portion to arcuately conform relative to, and be in moving contact against, a first arcuate portion of the substrate to at least partially remove the liquid carrier from the substrate.

2. The image formation device of claim 1, wherein either or both of:

the contact portion of the belt under tension to exert a pressure on the first arcuate portion of the substrate between about 1 kiloPascals to about 200 kiloPascals; and the contact portion has an arc length of at least 3 centimeters on the first arcuate portion of the substrate.

3. The image formation device of claim 1, wherein the belt is supported by a plurality of rollers spaced apart from each other along a length of the belt, wherein the rollers are positioned in locations other than a contact zone.

4. The image formation device of claim 1, wherein the support comprises either or both of:

a rotatable drum about which the substrate is secured to define an outer surface of the drum; or a second belt supported by an array of spaced apart rollers, and a contact zone is defined at a respective one of the rollers of the support.

5. The image formation device of claim 1, further comprising:

a vacuum arrangement on a side of the belt opposite the substrate in a contact zone to apply a vacuum to the liquid carrier to be removed via the belt.

6. The image formation device of claim 1, further comprising:

at least one second charge emitter on a side of belt opposite the substrate in a contact zone to emit airborne charges onto the contact portion of the belt to cause the belt to exert pressure against the substrate.

7. The image formation device of claim 6, further comprising:

a vacuum arrangement on a side of the belt opposite the substrate in the contact zone to apply a vacuum to the liquid carrier removed via the belt, the vacuum arrangement including a shell which at least partially surrounds the at least one charge emitter.

8. The image formation device of claim 6, further comprising:

a conductive element downstream along the travel path from the contact portion of the belt to discharge the charges from the belt.

9. The image formation device of claim 1, further comprising either or both of:

a dryer located downstream from the contact portion of the belt to evaporate the liquid carrier from the belt, wherein the belt comprises a porous structure to remove the liquid carrier from the belt; and a mechanical element located downstream from the contact portion of the belt to mechanically remove at least some of the liquid carrier from the belt, wherein the belt comprises a non-porous structure.

10. The image formation device of claim 1, further comprising:

a first charge emitter downstream along the travel path from the fluid ejection device, and upstream from the belt, to emit airborne charges to cause electrostatic fixation of at least the deposited ink particles relative to the substrate, wherein the liquid carrier comprises a non-aqueous liquid carrier.

11. An image formation device comprising:

a support to support movement of a substrate along a travel path;

a fluid ejection device along the travel path to deposit droplets of ink particles within a liquid carrier onto the substrate to at least partially form an image on the substrate; and a flexible first belt downstream along the travel path from the fluid ejection device;

a contact zone in which the first belt wrappably conforms to, and is to be in rolling contact against, an arcuate first portion of the substrate to at least partially remove the liquid carrier from the substrate as the substrate is to move along the travel path.

12. The image formation device of claim 11, wherein the support comprises either or both of:

a rotatable drum about which the substrate is secured to define an outer surface of the drum; or a second belt supported by an array of spaced apart rollers, and the contact zone is defined at a respective one of the rollers of the support.

13. A method comprising:

moving a substrate along a travel path;

depositing, via a fluid ejection device, droplets of ink particles within a liquid carrier onto the substrate to at least partially form an image on the substrate; and removing at least a portion of the liquid carrier from the substrate via applying a contact portion of flexible first belt in pressured conformable engagement against the substrate to define an arcuate contact zone between the contact portion and a first portion of the substrate.

14. The method of claim 13, further comprising:

supporting the belt via a plurality of rollers spaced apart from each other along a length of the belt, wherein the rollers are positioned in locations other than the contact zone.

15. The image formation device of claim 1, further comprising either or both of:

emitting, via at least one charge emitter on a side of belt opposite the substrate in the contact zone, emit airborne charges onto the contact portion of the belt; and applying a vacuum on the side of the belt opposite the substrate in the contact zone to remove the liquid carrier from the belt.

* * * * *